(No Model.)
S. R. RIFFLE.
ATTACHABLE BRAKE FOR WAGON BEDS.
No. 396,340. Patented Jan. 15, 1889.
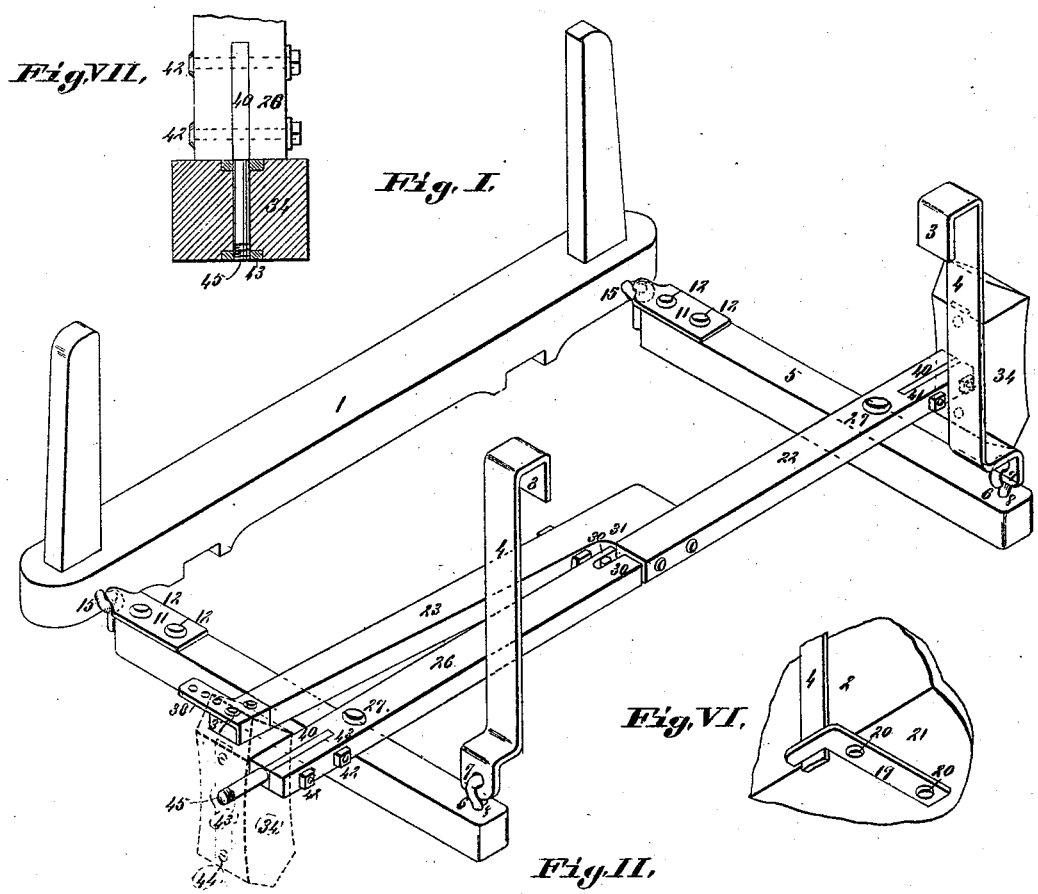

UNITED STATES PATENT OFFICE.

STEPHEN R. RIFFLE, OF FOLEY, MISSOURI.

ATTACHABLE BRAKE FOR WAGON-BEDS.

SPECIFICATION forming part of Letters Patent No. 396,340, dated January 15, 1889.

Application filed July 9, 1888. Serial No. 279,430. (No model.)

*To all whom it may concern:*

Be it known that I, STEPHEN R. RIFFLE, of Foley, in the county of Lincoln and State of Missouri, have invented a certain new and useful Improvement in Attachable Brakes for Wagon-Beds, of which the following is a full, clear, and exact description, reference being had to the accompanying drawings, forming part of this specification.

This invention is an improvement on the patent, No. 378,337, on a combined wagon bed and brake issued to me February 21, 1888, and relates to devices for an attachable and knockdown wagon-brake; and the invention consists in features of novelty hereinafter fully described, and pointed out in the claims.

Figure I is a perspective view of my attachable sectional brake set up ready for attachment to any common box-bed and hooked to the rear bolster of the wagon. Fig. II is a side elevation of a wagon-bed with my brake attached. Fig. III is an enlarged view of the adjustable T-hook attachment of the brake-levers. Fig. IV is a detail perspective view of the coupling end of the attachable section of the brake-lever. Fig. V is a detail view of the T-bolt that adjustably secures the sections of the brake-lever together. Fig. VI is a detail view of the pendent hook for attachment to the side-board of the wagon-bed, that supports the forward end of my attachable brake device, and the hook on the bottom of box for holding the bottom of the pendent hook; and Fig. VII is a horizontal section through the brake-shoe, and shows its screw pivotal attachment to the brake-levers.

Referring to the drawings, in which similar figures of reference indicate like parts in all the views, 1 represents the rear bolster of a wagon, to which the rear ends of my attachable brake are secured.

2 represents one of the side-boards of the bed, on which the hooks 3 of the straps 4 engage. The said straps support the forward end of the brake attachment, to the carrier-bar 5 of which they are secured by hook-bolts 6, the hooks of which engage in perforations 7 in said strap, and the screw-bolts of which pass through the bolt-holes 8 in the carrier-bar, beneath which they are secured by screw-nuts 9, which are seated on washers 10.

The rear ends of the carrier-bars are secured to the rear bolster by strap-hooks 11, which are fastened to the bars by screw-bolts 12 and their nuts 13, the said nuts being seated on washers 14. The hooks of said straps drop into the eyelets of the eyelet-bolts 15 when the device is attached in position. The eyelet-bolts are seated in horizontal holes 16 in the rear bolster and are there secured by screw-nuts 17, which engage on the screw-threaded ends of said bolts, which nuts are seated on washers 18.

It will thus be seen that the above constitutes a hanger-frame which is rigidly attachable to any common wagon-bed, the only parts that it does not itself carry being the eyelet-bolts 15, that are secured to the rear bolster, and into which the strap-hooks on the carrier-bars of the device drop when the attachment is made. To effect said attachment all that is required is to seat said hooks to secure their attachment to the bolster at the rear and the hooks 3 of the pendent straps 4 on the side-boards of the bed for its forward box attachment. The hook ends of the angle-straps 19, which are secured by bolts or rivets 20 to the bottom of the wagon-bed 21, engage with the pendent straps 4, that support the forward end of the hanger-frame, and thereby the wagon-bed is held from working forward on downgrades, as the hooks of said straps present forward and come into engagement with the pendent hooks 4 from the rear, and the strap-hooks at the rear of the carrier-bars are firmly secured to the eyelet-bolts attached to the immovable rear bolster of the wagon, so that the brake attachment, instead of surging the bed forward on a downgrade by the action of the brake, in this device resists said adverse movement.

22 represents the rubber section of the operative brake-bar, and 23 is the drive-section of said bar, which latter section enlarges toward its junction with the rubber section and curves round at the junction to considerably increase its width, the junction being effected edge on and secured by screw-bolts 24. An extended recess is thus provided in which to locate the coupling of the subsidiary section of the brake-bars by the enlarged end of said drive brake-bar and its curved cut-away adjacent to the junction and by the projection inside thereof of the inner end of its junction-section. The said operative brake-bar is pivotally connected to one of the carrier-bars of the hanger-frame that supports it by the pivot-pin 25.

26 represents the aforesaid subsidiary section of the brake-bars, which is pivoted near its rubber end to the carrier-bar of the hanger-frame that supports it by the pin 27.

28 is a screw-shanked T-bolt, which passes through the horizontal slot 29, between the triplicated forks 30, at the junction end of the subsidiary brake-bar, and whose T-head is seated in the vertical slot 31, also between said forks. The screw-shank of said T-bolt is seated in the bolt-hole 32 in the drive-section of the operating brake-bar, and the screw-nuts 33 on said bolt and located on each side of said bar are turned on or off relatively to regulate the relative adjustment of the sections of the brake-bar and of the rubbers 34 they carry, so as to adjust the working-joint that connects the loose section of the brake-bar with the tight-jointed sections to keep the rubber sections on line with each other and provide an even friction of the rubbers against the wheels with which they relatively engage. Washers 35 on the T-bolts seat the adjusting screw-nuts.

36 represents a perforated angle-plate, one arm of which is secured to the drag end of the operative brake-bar by screw-bolts 37. The rod 38 from the usual actuating hand-lever is provided with a hook, 39, that is adjustably seated in one or other of the holes in the angle-plate, according as to the tightness desired for the tension of the rubbers.

40 represents metal strap-bolts, whose strap ends are seated in the slots 41 at the rubber terminals of the brake-bars and are there secured by screw-bolts 42. The out-tip of the bolt end of said strap-bolts is screw-threaded for attachment to the rubbers, as hereinafter described.

The rubbers 34 are preferably constructed of wood with the grain presented endwise to the friction-surface, so as to provide both a more efficient friction and also to much more effectually resist the wear. The rubbers are cut with two friction-surfaces curved to an arc corresponding to that of the periphery of the tire of the wheel, and are thus reversible, so that when one side is much worn the other can be used.

As the wooden rubbers are, as stated, cut across the grain, so as to present the grain endwise to their friction-surface to strengthen said rubbers, perforated metal straps 43 are provided, that are inlaid lengthwise of the rubbers both inside and outside the blocks, so as not to interfere with the friction-faces of the rubber, and are secured to said rubbers by screws 44. The stay-bolts 40, that, as stated, are bolted within the slots in the terminals of the brake-bars, are provided at the tip of their bolt ends with screw-points 45. The bolts pass through and have loose bearings within the central perforations of the inner straps, and their screw-tips 45 engage in the screw-threaded perforations 46 of the straps on the outside of the rubbers. It will thus be seen that said rubbers have a pivotal attachment on the strap-bolts at the outer terminals of the brake-bars, and are not attached in the usual way by loose bolts and nuts, that are in danger of rattling loose or splitting the rubber-block. In this form of attachment the bolt cannot split the rubber, for said rubber is bound by the straps that also couple the attachment of the bolts to the rubbers. The rubbers are beveled in a conical or spire form at top, so as to present the best form to sustain the friction wear at the first grasp of the rubber on the tire and to clean the dirt from said tire, the apex of the bevel top pressing against the middle of the tire and scraping the dirt off to either hand; also, the lower ends of the rubbers are beveled off from contact with the tire, so as to preserve the rubber from peeling or splitting off under the final frictional contact. It will also be seen that the rubber, which is cut with curved friction-faces that conform to the periphery of the tire of the wheel when it is brought into contact with said tire, is drawn thereby into exact frictional unison therewith, as it turns readily in pivotal adjustment on the bolt that carries it; also, its friction-face is turned by the rotating tire until the rubber-brake becomes a rubber-lock. The rubbers are made reversible, so that when one side is much worn they can be changed to present the reverse side. It will also be seen that this brake is easily attachable to any common wagon and detachable therefrom, as the hooks at the top of the pendent straps, that carry the forward end of the hanger-frame, are readily hooked on the side-boards of the wagon-bed, and the strap-hooks on the rear of said hanger-frame are slipped into the eyelet-bolts that are secured to the front of the rear bolster of the wagon; also, being secured by that means, the rubber-holdback draft is direct from the stationary rear bolster, and instead of, as does the common brake, tending to throw the bed forward, this device firmly holds it from said adverse movement when braking on a downgrade, and is also assisted in holding back the bed by the strap angle-hooks secured to the bottom of the bed and which grasp the pendent hooks that carry the forward end of the carrier-frame; also, the adjustable T-bolted attachment joint of the subsidiary brake-bar to the operative brake-bar provides the means for adjusting to a nicety the relative corresponding positions and consequent friction of the two rubbers attached to said bars.

I claim as my invention—

1. In a wagon-brake, a hanger-frame that carries the brake-bars, which frame is secured to the stationary bolster in the rear and by pendent hooks to the wagon-bed in front, substantially as and for the purpose set forth.

2. In a wagon-brake, the combination of the carrier-bars that support the brake-bars, the strap-hooks secured to the rear end of said bars, and the eyelet-bolts in which they engage, said bolts being secured to the stationary bolster, the pendent straps whose hooks saddle over the side-boards of the wagon-bed, and the hook-bolts that secure the front ends of the carrier-bars to said pendent straps, substantially as and for the purpose set forth.

3. In a wagon-brake, the combination of the hanger-frame that carries the brake-bars, the strap-hooks and eyelet-bolts that secure said frame to the stationary bolster, and pendent strap-hooks that secure it to the wagon-bed, the operative brake-bar that spans the carrier-bars, and the pivot-pin that secures it to one of said bars, the said bar being formed in two sections bolted together near the middle in a form to provide an offset and recess, the said recess providing room for the attachment of the subsidiary section of the brake-bar, substantially as and for the purpose set forth.

4. In a wagon-brake, the combination of the hanger-frame that carries the brake-bars, secured from adverse longitudinal movement while braking by attachment to the stationary bolster, and the hanger-strap hooks by which it is suspended from the wagon-bed, and the angle-hooks secured to the bottom of said wagon-bed and that engage with said hanger-straps that lock said bed from an adverse slide on a downgrade, substantially as and for the purpose set forth.

5. In a wagon-brake, the combination of the attachable and detachable hanger-frame, the sectional operative brake-bar that spans from one carrier-bar of the frame to the other and is pivoted near one end to one of said carrier-bars of the hanger-frame, the bolted attachment of the sections of said brake-bar in a position to form a recess at said junction, the subsidiary brake-bar whose attachment end is located in said recess, the triplicated fork at said end of said bar that provides cross-slots in its end, the T screw-bolt that passes through the horizontal slot between said forks, whose T-head is seated in the vertical slot and whose screw-bolt is secured in its perforated seat in the operative brake-bar, and the screw-nuts on said bolt that adjust the relative attachment of the subsidiary brake-bar to the operative bar in line with said bar, and pivot-pin that secures the subsidiary bar to the carrier-bar that supports it, substantially as and for the purpose set forth.

6. In a wagon-brake, the combination of the hanger-frame that carries the brake-bars, secured to the stationary bolster in the rear and in front by pendent bars to the wagon-bed above, the sectional operative brake-bar formed with a recess in which is jointed the subsidiary brake-bar, the metal straps that are seated in the slots at the terminals of said brake-bars, with screw-bolt extensions for the attachment of the rubbers and the screw-bolts that pass through said brake-bars, and metal straps to secure them together, substantially as and for the purpose set forth.

7. In a wagon-brake, the combination of the hanger-frame that carries the brake-bars, the sectional brake-bars they carry, the metal bolted straps and screw-bolts secured in slots at the terminals of said bars, the wooden reversible rotating rubbers arranged with the grain end on for friction service, the metal tie-straps inside and outside of said rubbers, through the central perforations in which the attachment bolts on the terminals of the brake-bars pass and in the outer one of which they have a locking-screw attachment, the said rubbers on their friction-surfaces cut with a curve to correspond with the periphery of the tire and bevel-edged at top and bottom to best take on friction at top and prevent splitting with the grain at bottom, substantially as and for the purpose set forth.

STEPHEN R. RIFFLE.

In presence of—
BENJN. A. KNIGHT,
SAML. KNIGHT.